United States Patent [19]

Healey

[11] Patent Number: 5,184,568
[45] Date of Patent: Feb. 9, 1993

[54] CAT SCRATCHING HOUSING AND BED APPARATUS

[76] Inventor: James M. Healey, 113 Joseph Ave., Westfield, Mass. 01085

[21] Appl. No.: 900,669

[22] Filed: Jun. 19, 1992

[51] Int. Cl.⁵ .............................................. A01K 29/00
[52] U.S. Cl. .................................... 119/19; 119/28.5; 119/165
[58] Field of Search .................... 119/28.5, 165, 19

[56] References Cited

U.S. PATENT DOCUMENTS

| | | | |
|---|---|---|---|
| 3,618,568 | 11/1971 | Breeden | 119/28.5 X |
| 4,347,807 | 9/1982 | Reich | 119/19 |
| 4,696,257 | 9/1987 | Neary et al. | 119/19 X |
| 5,002,012 | 3/1991 | Pierrot | 119/29 X |
| 5,080,042 | 1/1992 | Rubin | 119/29 |
| 5,092,270 | 3/1992 | Simons et al. | 119/19 |

Primary Examiner—Robert P. Swiatek
Assistant Examiner—Thomas Price
Attorney, Agent, or Firm—Leon Gilden

[57] ABSTRACT

A housing structure arranged to afford a scratching surface for cats simulating household furniture, with the housing affording a bed and amusement for the cat in the form of a catnip type ball mounted from an associated tether. A modification of the invention includes a litter tray slidably mounted from within the housing and optionally the use of an observation plate accessible by the cat to an upper distal end of the housing structure.

8 Claims, 4 Drawing Sheets

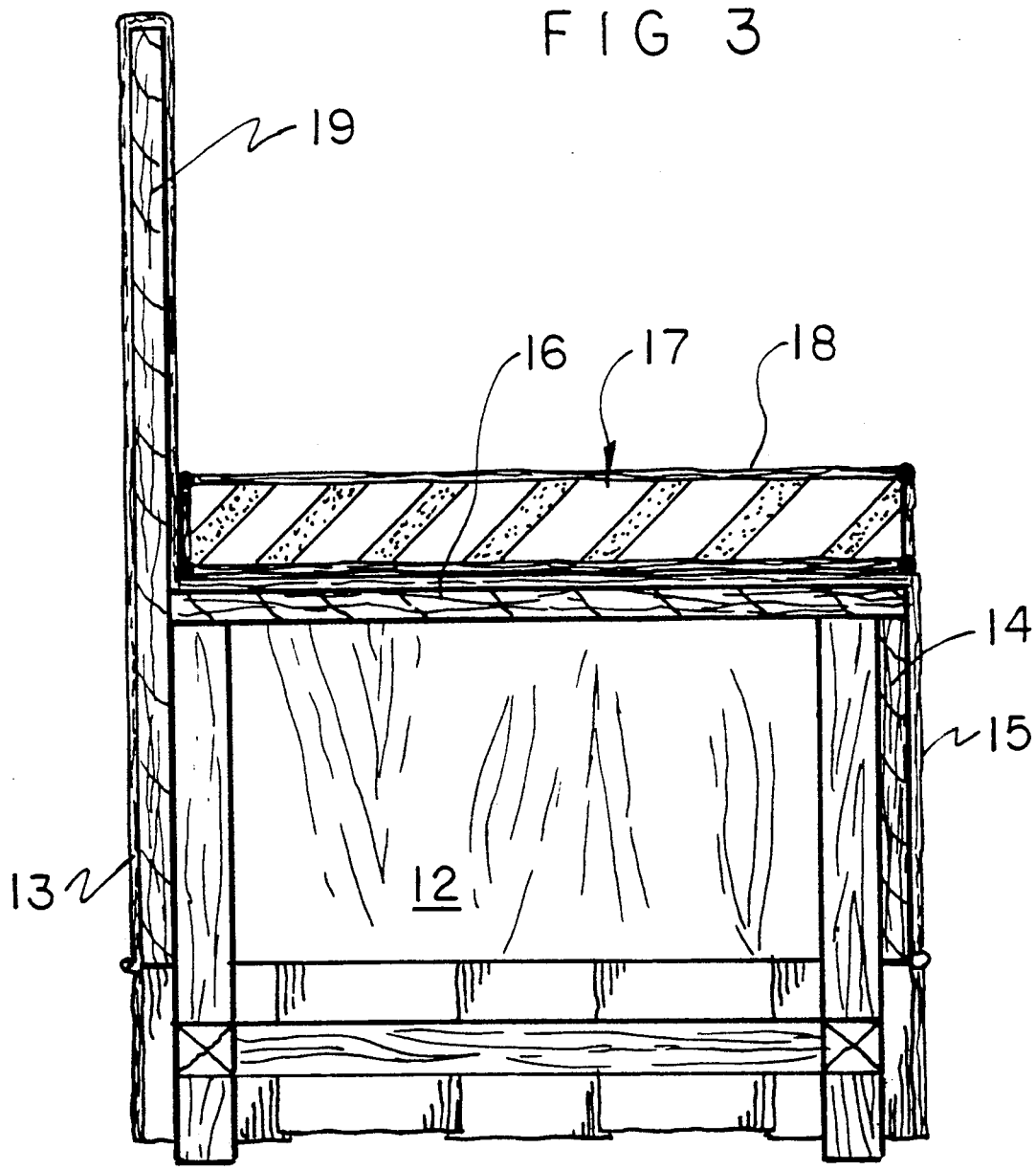

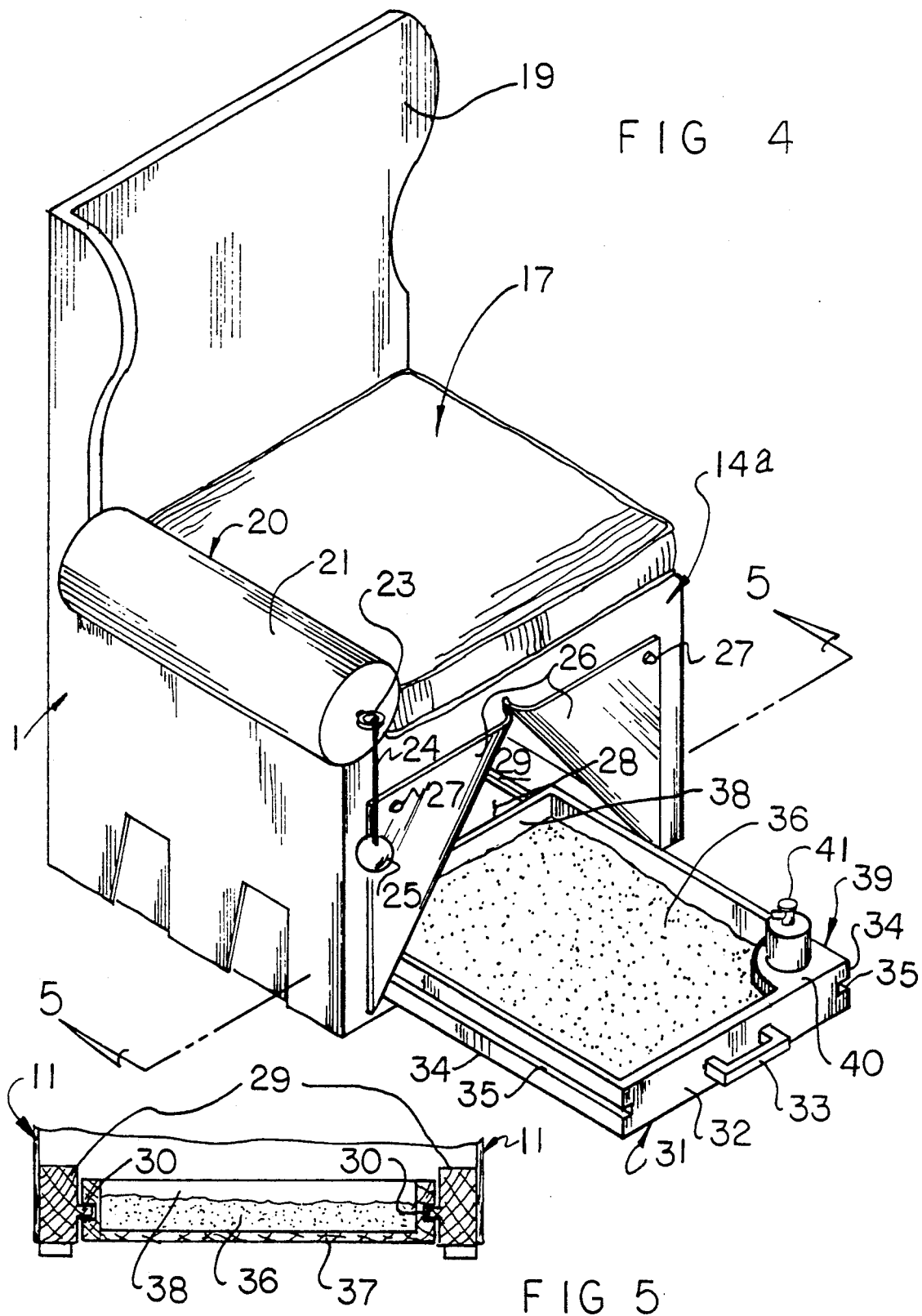

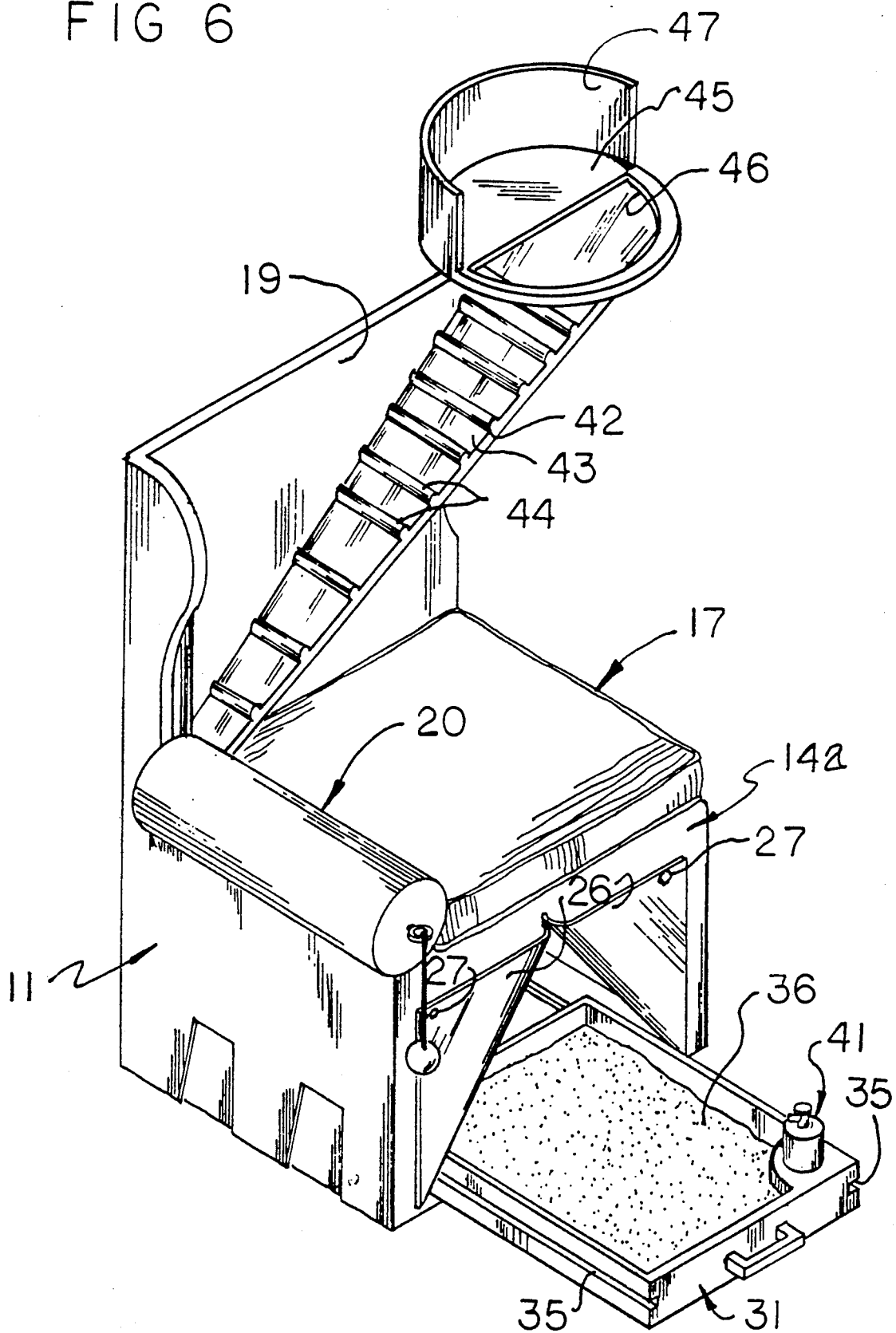

CAT SCRATCHING HOUSING AND BED APPARATUS

BACKGROUND OF THE INVENTION

1. Field of the Invention

The field of invention relates to cat entertainment apparatus, and more particularly pertains to a new and improved cat scratching housing and bed apparatus wherein the same is arranged for the amusement and comfort of cats.

2. Description of the Prior Art

Cats, and particularly cats contained within a dwelling, are typically afforded places to sleep, as well as scratching posts to distract cats from effecting such scratching on household furniture. The instant invention attempts to overcome deficiencies of the prior art by providing for a housing structure to provide for the entertainment and comfort of a cat in a unitary compact construction. Prior art cat scratching post structure is exemplified in U.S. Pat. No. 4,177,763 to Cook.

The U.S. Pat. No. 4,611,556 to Frank sets forth a cat scratching post arranged for vertical mounting.

The U.S. Pat. Nos. 3,993,027; 4,253,423; and 4,790,265 are further examples of cat scratching post assemblies.

As such, it may be appreciated that there continues to be a need for a new and improved cat scratching housing and bed apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cat accommodating apparatus now present in the prior art, the present invention provides a cat scratching housing and bed apparatus wherein the same is addressed to the comfort and convenience of a cat to afford a scratching surface and bed for the cat. As such, the general purpose of the present invention, which will be described subsequently in greater detail, is to provide a new and improved cat scratching housing and bed apparatus which has all the advantages of the prior art cat entertainment apparatus and none of the disadvantages.

To attain this, the present invention provides a housing structure arranged to afford a scratching surface for the cat simulating household furniture, with the housing affording a bed and amusement for the cat in the form of a catnip type ball mounted from an associated tether. A modification of the invention includes a litter tray slidably mounted from within the housing and optionally the use of an observation plate accessible by the cat to an upper distal end of the housing structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cat scratching housing and bed apparatus which has all the advantages of the prior art cat entertainment apparatus and none of the disadvantages.

It is another object of the present invention to provide a new and improved cat scratching housing and bed apparatus which may be easily and efficiently manufactured and marketed.

It is a further object of the present invention to provide a new and improved cat scratching housing and bed apparatus which is of a durable and reliable construction.

An even further object of the present invention is to provide a new and improved cat scratching housing and bed apparatus which is susceptible of a low cost of manufacture with regard to both materials and labor, and which accordingly is then susceptible of low prices of sale to the consuming public, thereby making such cat scratching housing and bed apparatus economically available to the buying public.

Still yet another object of the present invention is to provide a new and improved cat scratching housing and bed apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic side view of the invention, taken along the lines 2—2 of FIG. 1 in the direction indicated by the arrows.

FIG. 3 is an orthographic view, taken along the lines 3—3 of FIG. 1 in the direction indicated by the arrows.

FIG. 4 is an isometric illustration of a modified aspect of the invention.

FIG. 5 is an orthographic view, taken along the lines 5—5 of FIG. 4 in the direction indicated by the arrows.

FIG. 6 is an isometric illustration of a yet further modified aspect of the invention.

DESCRIPTION OF THE PREFERRED EMBODIMENT

Figure 1:
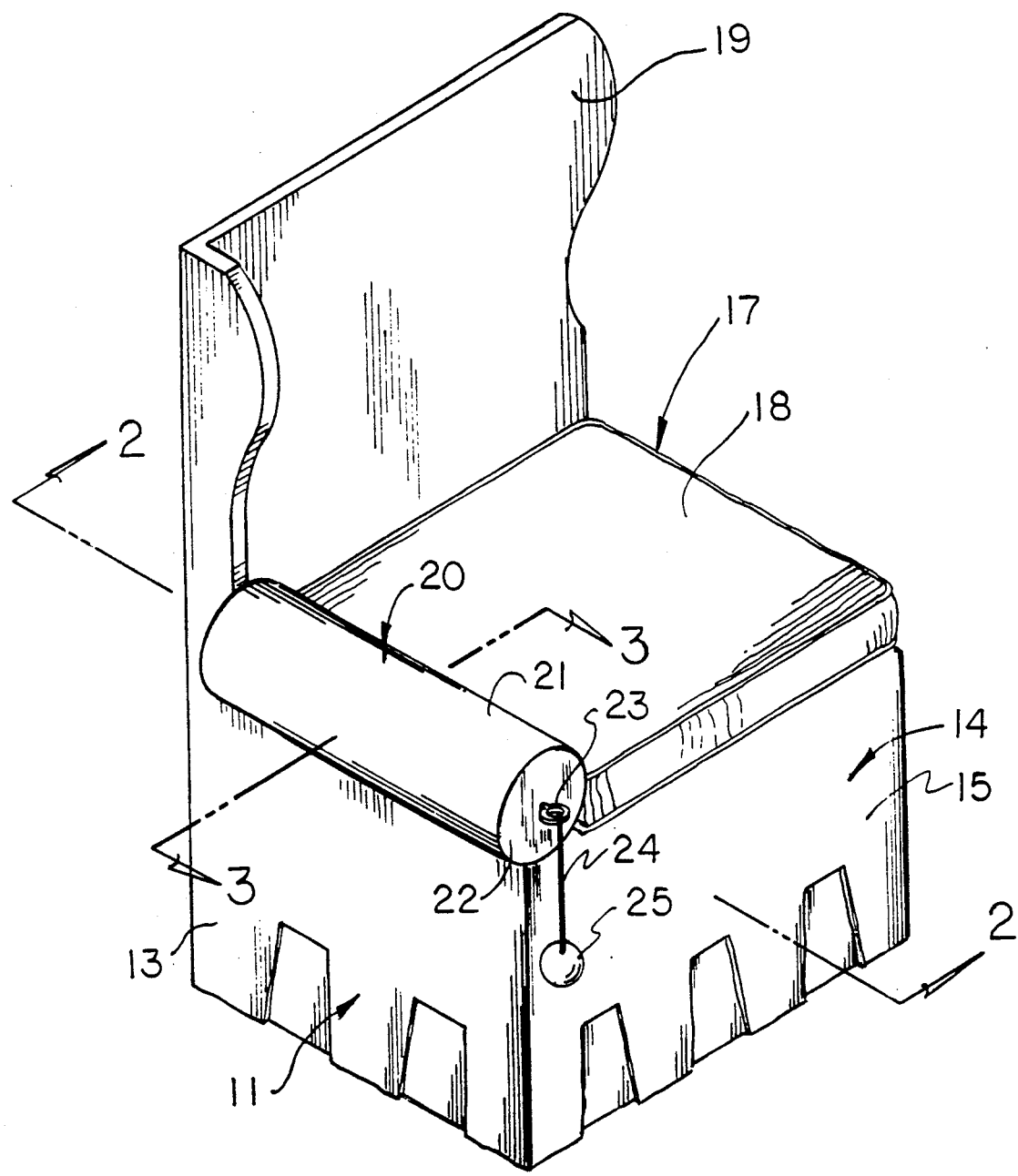
FIG. 1 is an isometric illustration of the instant invention.

With reference now to the drawings, and in particular to FIGS. 1 to 6 thereof, a new and improved cat scratching housing and bed apparatus embodying the principles and concepts of the present invention and generally designated by the reference numeral 10 will be described.

More specifically, the cat scratching housing and bed apparatus 10 of the instant invention essentially comprises parallel rigid side walls 11 mounted onto a housing frame that includes rigid side wall frames 12. If desired, side wall fabric outer layers 13 may be secured coextensively to the side walls 11. A front wall 14 is provided, with a front wall fabric outer layer 15 (see FIG. 2). A top wall 16 mounted to the side walls of the front wall includes a cushion member 17 securable thereon. The cushion member 17 includes a cushion member fabric outer layer 18 mounted coextensively about a polymeric foam core. A rigid rear wall 19 extends upwardly and orthogonally relative to the side walls 11 above the top wall and cushion member 16 and 17 respectively. A cylindrical cushion bolster 20 is mounted to at least one of the side walls 11 coextensively of an upper edge of the side wall, wherein the cushion bolster 20 includes a fabric bolster outer layer 21 over a polymeric foam cylindrical core. A bolster rigid front wall 22 is mounted to a forward distal end of the bolster arranged substantially adjacent to the front wall 14, with the bolster rigid front wall 22 having a support loop 23 mounted thereon. The support loop 23 includes a tether line 24 secured thereto, with the tether line 24 extending downwardly from the support loop 23, with a catnip ball 25 mounted to an outer distal end of the tether line 24 spaced from the loop 23 for entertainment and amusement of a cat member.

The FIG. 4 indicates the use of the front wall having front wall flexible flap members 26 opened relative to one another for access to a housing cavity 28 between the side walls and front wall below the top wall. Fasteners 27 typically secure the flap members 26 to the front wall. Floor rails 29 are mounted to lower distal ends of the side walls 11, with the floor rails 29 in a parallel coextensive relationship relative to one another, each having a floor rail flange 30. The floor rail flanges 30 are arranged in a coplanar, parallel, and coextensive relationship to slidingly receive a litter tray 31 therebetween. The litter tray 31 includes a litter tray front wall 32 having a front wall handle 33 for ease of manual manipulation of the litter tray 31 relative to the housing cavity 28. Tray side walls 34 are arranged in a parallel coextensive relationship, each having a side wall groove 35. The side wall grooves receive the floor rail flanges 30 to slidingly secure the litter tray 31 within the housing cavity. Absorbent granular material 36 is contained within the tray coextensively over a tray floor 37 between the tray front wall 32 and the tray rear wall 38. A tray support boss 39 mounted to the tray includes a boss top wall 40 coplanar with the upper edges of the side walls, front wall, and rear wall of the tray structure. A spray container 41 having a deodorizing fluid contained therewithin is mounted within the support boss 39 to permit selective projection of a deodorizing spray onto the granular material 36.

The FIG. 6 further indicates the use of a ramp 42 fixedly mounted to a forward surface of the housing rear wall 19 extending from a lower distal end of the rear wall canted upwardly relative to the top wall of the housing mounted orthogonally relative to the rear wall, including a ramp top wall 43 having parallel ribs 44 to permit a cat member to ascend the ramp and be received within a plate opening 46 of an observation plate 45. The observation plate 45 includes a wall 47 orthogonally mounted to the plate, wherein a cat member may achieve elevation for observation and amusement of the animal.

As to the member of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cat scratching housing and bed apparatus, comprising, spaced side walls, the side walls each including a rigid side wall frame having a fabric outer layer mounted coextensively relative to the side wall frame, and a front wall, a rear wall mounted to the side walls, with a top wall, and a housing cavity defined within the side walls, rear wall, front wall, and top wall, and a cushion member mounted coextensively to the top wall, with the cushion member including a polymeric foam cushion member core having a fabric outer layer mounted coextensively about the core, and the rear wall having a rigid rear wall extension coplanar with the rear wall extending orthogonally and upwardly relative to the side walls including a cylindrical cushion bolster having a cushion bolster central section, with the cushion bolster central section formed of a polymeric foam and a fabric bolster outer layer mounted to the cushion bolster central section coextensively there about, and the bolster including a rigid bolster front wall extending beyond the housing side walls, and the front wall including a support loop, the support loop including a tether line secured thereto, the tether line including a tether line forward distal end spaced from the support loop, and a catnip ball mounted to the tether line forward distal end.

2. An apparatus as set forth in claim 1 wherein the front wall includes front wall flexible flap members, each flap member including a fastener to secure the flap member to the front wall affording access to the housing cavity.

3. An apparatus as set forth in claim 2 wherein the housing cavity includes a plurality of floor rails arranged in a parallel coextensive relationship relative to one another, with each floor rail mounted to a lower distal end of each side wall, and said floor including a floor rail flange, the flange arranged in a parallel, coplanar, and coextensive relationship relative to one another and in confronting relationship relative to one another, and a litter tray slidably mounted to the floor rail flanges arranged for reciprocation from the housing cavity in a first position to an extended orientation relative to the housing cavity in a second position.

4. An apparatus as set forth in claim 3 wherein the litter tray includes litter tray side walls, wherein each litter tray side wall includes a side wall groove, and each groove is arranged to receive one of said floor rail flanges therewithin, the litter tray including a litter tray floor, a litter tray front wall, and a litter tray rear wall, and a front wall handle mounted to the front wall for manipulation of the litter tray relative to the housing cavity, and an absorbent granular material contained coextensively within the litter tray over the litter tray floor.

5. An apparatus as set forth in claim 4 wherein the litter tray includes a tray support boss mounted within the litter tray, and the litter tray support boss including a boss top wall, and a spray container directed into the support boss through the support boss top wall, with the support container including a deodorizing fluid contained therewithin for projection over the granular material.

6. An apparatus as set forth in claim 5 including a ramp member, the ramp member fixedly mounted orthogonally relative to the housing rear wall extension, with the ramp member arranged in a canted orientation relative to the rear wall extension, the ramp member including a ramp member top wall, the ramp member extension including a ramp extension upper edge, and an observation plate fixedly mounted to the rear wall extension upper edge, with the ramp member extending into communication with an observation plate.

7. An apparatus as set forth in claim 6 wherein the observation plate includes an observation plate opening, the observation plate opening receives the ramp member therethrough.

8. An apparatus as set forth in claim 7 wherein the ramp member includes a ramp member top wall, and the ramp member top wall includes a plurality of parallel ribs to enhance ease of frictional engagement of a cat with the ramp member.

* * * * *